March 24, 1964    WOLF-DIETER BENSINGER    3,125,893
SHIFTING ARRANGEMENT FOR CHANGE-SPEED
TRANSMISSIONS, PARTICULARLY IN
MOTOR VEHICLES Filed Nov. 18, 1957            3 Sheets-Sheet 1

INVENTOR
WOLF-DIETER BENSINGER

BY *Deere and Craig*

ATTORNEYS.

INVENTOR
WOLF-DIETER BENSINGER

BY Diere and Craig

ATTORNEYS

United States Patent Office 3,125,893
Patented Mar. 24, 1964

3,125,893
SHIFTING ARRANGEMENT FOR CHANGE-SPEED TRANSMISSIONS, PARTICULARLY IN MOTOR VEHICLES
Wolf-Dieter Bensinger, Stuttgart-Unterturkheim, Germany, assignor to Daimler-Benz Aktiengesellschaft, Stuttgart-Unterturkheim, Germany
Filed Nov. 18, 1957, Ser. No. 697,215
Claims priority, application Germany Nov. 24, 1956
45 Claims. (Cl. 74—472)

The present invention relates to an arrangement for shifting change-speed transmissions, especially in motor vehicles, and more particularly relates to a shifting arrangement for transmissions which utilize an automatic clutch.

The characteristics of an internal combustion engine are ordinarily poorly matched, as is well known, to the driving characteristics so that ordinarily the vehicle is driven within a partial-load region in which the fuel consumption is relatively high.

By the addition of other transmission steps or ratios, for example, by the addition of an overdrive, the fuel consumption could be considerably reduced, however, the manual shifting of the present-day ordinary four-speed transmissions already offers difficulties. A driver with little experience does not find always with certainty, for example, the second speed, when shifting down from third speed in such transmissions. The ordinary driver or customer might, therefore, find himself no longer able to readily operate a six-speed change-speed transmission.

The conventional overdrive also has not become very popular for the reason that the acceleration in the overdrive speed is inherently relatively poor and it, therefore, becomes necessary, for example, in case of danger, to shift for purposes of acceleration.

A fully automatic shifting of the overdrive has the same disadvantage as the known United States automatic transmissions, namely that every time the foot is taken off the gas pedal the next higher speed is engaged and a shifting back into the next lower speed can only be obtained again by forcibly stepping on the gas pedal to give a predetermined amount of gas.

The present invention has as its main purpose to avoid the aforementioned disadvantages inherent in the different prior art devices. The problems thereof are solved in accordance with the present invention in that with the change-speed transmissions described hereinabove, a guide means or member, for example, a cam disk, a slotted guide disk, or a shifting roller, is arranged in or at the gear box of the aforementioned types of change-speed transmissions for purpose of guiding the shifting forks and in that such guide means is operatively connected with a step-by-step shifting mechanism, which is selectively movable in two directions by means of an auxiliary force actuated either at will and/or automatically.

In one preferred embodiment of the present invention, the guide means, such as the cam disk or slotted disk and the step-by-step shifting mechanism are constructed as a round rotatable disk and an entrainment member is coordinated to and adapted to cooperate with the rotatable disk which itself is moved or actuated by an auxiliary force.

It is particularly appropriate if the guide disk and the notched disk forming the step-by-step mechanism are combined into a unitary shifting disk which is arranged laterally within the transmission housing or in a separate auxiliary casing. A shifting lever is thereby rotatably supported on the shaft of the shifting disk.

An electric drive means is preferred in accordance with the present invention as the auxiliary force for the actuation of the shifting lever, and the shifting lever is rotated, either directly or indirectly, by means of a double solenoid in both directions of rotation about the axis of the shifting disk against a spring force.

The arrangement according to the present invention enables a transmission with as many transmission ratios or speeds as are necessary for proper matching with and adaptation to the output characteristics of the engine. The shifting takes place either by actuation of an "up-down" shifting lever or of a push button, either manually or automatically in dependence on the position of the gas pedal and/or of a centrifugal governor, except, however, never automatically without gas during braking in the "down" direction, i.e., when shifting to a lower speed.

The arrangement according to the present invention, therefore, renders possible that the driver is able to prepare for any particular traffic condition, such as downhill drive or city-traffic which is only possible within a limited scope with the known automatic transmissions. The arrangement according to the present invention is very simple in construction and may be manufactured or installed without any great expenditures. By reason of the large number of speeds or transmission steps or ratios which are made possible by an arrangement in accordance with the present invention, a considerable reduction of the fuel consumption is also rendered feasible.

The present invention is also concerned with a locking arrangement for locking in itself a change-speed transmission of the type mentioned hereinabove, particularly for motor vehicles, so as to provide a "parking" position therefor, i.e., for purposes of locking the transmission in itself when the vehicle is parked.

Such an arrangement has particular significance for change-speed transmissions in which a rotatable guide disk or shifting roller is provided for purposes of guiding the shifting forks and in which a step-by-step shifting mechanism is connected therewith which is movable in both directions by an auxiliary force as outlined hereinabove.

Ordinarily, motor vehicles are locked or secured against unintentional or unauthorized movement, for example, when being parked on a steep hill by engaging a speed of the manually actuated change-speed transmission. However, such securing does not always satisfy the existing requirements. This is so because the transmission is not actually locked in itself so that locking of the driven wheels is not attained thereby but solely the engine which is at standstill is connected with the drive axle.

In automatic transmissions, it has also been proposed to provide a so-called "parking" position by moving a relatively stationary finger into engagement with one of the rotatable gears when the preselector is set to "parking" position. However, such arrangement is readily subject to damage since the detent may be sheared off upon the occurrence of the necessary force thereby damaging the transmission.

It is, therefore, obviously desirable to provide an arrangement for completely non-rotatably locking the change-speed transmission.

Accordingly, the present invention also consists essentially in that with the aforementioned type of change-speed transmissions the guide means for the shifting forks, for example, in the form of a guide disk or shifting roller, may be moved or rotated beyond the normal shifting positions thereof into a further position additional to the positions thereof for the engagement of the various speeds, and in that the guide means, for example, the slots in the guide disk or shifting roller, are so constructed that in this further position two different speeds or transmission ratios of the same transmission are simultaneously engaged, i.e., in that the gears or elements belonging to two separate transmission ratios are simultaneously engaged thereby to effectively lock the transmission in itself.

By an appropriate guidance of the shifting forks, two loosely mounted gears of the same transmission shaft, the counter gears of which are connected with another transmission shaft, are both non-rotatably secured to the respective shaft thereof whereby one of the two shafts forms the transmission output shaft or a shaft adapted to be clutched therewith.

According to a preferred embodiment in accordance with the present invention, two loosely rotatable gears of the transmission output shaft itself are adapted to be clutched or connected with the output transmission shaft while the gears meshing therewith are non-rotatably mounted on a counter shaft. It is appropriate to select the ratios of the two simultaneously engageable transmission ratios or speeds in such a way that they belong to two speeds numerically as far apart as possible. Possibly, one of these two simultaneously engageable speeds may be the reverse speed.

The "parking" position provided for locking the transmission in itself may be arranged at the guide means for the shifting fork, for example, at the guide disk or shifting roller, following the position thereat corresponding to reverse speed thereof. Under certain conditions, a more easy actuation of the locking may be obtained if the locking or parking position on the guide means, for example, on the guide disk, is disposed in parallel to the reverse speed and the guidances, such as slots, in the guide disk are provided, proceeding from neutral thereof, with two branches selected by a switch or the like, such as an electromagnetically or mechanically actuated finger member pivoted on the disk and having two positions in the manner of a toggle switch to block one or the other slotted branch and of such configuration as to guide the shifting forks into the other branch.

The drive for the guide means or member, for example, for the guide disk into the locking position thereof and the selection of the position of the switch is thereby actuatable separate from the remainder transmission actuation or shifting arrangement by means of a separate engaging member. For instance, a push button at the dash board may be provided as such actuating member. In order to prevent inadvertent engagement of the parking or locking position, a locking member is arranged at the guide member, for example, at the guide disk, and/or at the actuating member in such a manner that shifting into the locking or parking position can take place exclusively during standstill of the transmission output shaft.

According to a further feature of the present invention, the actuating member for the locking or parking position may be actuated additionally or exclusively automatically, for example, by the door lock during locking of the motor vehicle doors.

The present invention also proposes such an arrangement which locks the other shifting mechanism of the transmission upon engagement of the locking or parking position in such a manner that with the locking or parking speed engaged, no other shifting and no shifting back to any other speed from the locking position is possible. As a result of such a construction, the shifting back from or out of the locking position and the unlocking of the other shifting mechanism can then only take place by the same transmission actuating member which produces engagement thereof. An additional particular safety feature may be realized by providing a further separate member, for example, an additional safety lock, at the dashboard for the "parking" position.

Accordingly, it is an object of the present invention to provide a shifting mechanism for change-speed transmissions, particularly for motor vehicles, which enables the use of as many speeds or gear ratios as necessary to adapt the engine characteristics to the driving characteristics of the vehicle.

It is still another object of the present invention to provide a shifting mechanism in which the various speeds of the change-speed transmissions are engaged in a step-by-step manner, either selectively at the will of the driver and/or automatically, and which makes it possible even for a relatively inexperienced driver to operate the shifting mechanism with safety and certainty.

Still another object of the present invention resides in the provision of a step-by-step shifting mechanism which is both simple and reliable in operation without requiring any skill of the operator.

Still another object of the present invention is the provision of a semi-automatic shifting mechanism for change-speed transmissions of motor vehicles in which shifting may be initiated by the driver in either direction and which also provides for automatic operation thereof under certain conditions.

A still further object of the present invention is the provision of a shifting mechanism for change-speed transmissions of motor vehicles which considerably reduces the fuel consumption and therewith increases the economy of operation of the vehicle.

Another object of the present invention is to provide a shifting mechanism which permits the use of change-speed gears in passenger motor vehicles operated by average drivers having as many speeds as necessary for economic operation of the vehicle.

Still another object of the present invention resides in the provision of a shifting mechanism which permits the driver to readily prepare for any particular anticipated traffic conditions.

Another feature of the present invention resides in the provision of a shifting mechanism which may be readily installed or added to existing manually operated change-speed transmissions and which is both simple, inexpensive and sturdy in construction.

Another object of the present invention resides in the provision of a simple and effective means to provide locking of the transmission in order to effectively lock the driven wheels thereby effectively constituting a "parking" position for the transmission.

Still another object of the present invention resides in the provision of means to prevent inadvertent operation of the shifting mechanism of the transmission into the parking or locking position thereof or out of this position.

Another object of the present invention is to obviate all of the disadvantages encountered in connection with change-speed transmissions as mentioned hereinabove by providing a shifting mechanism which is versatile insofar as its operation and functioning are concerned and which is, nevertheless, relatively simple in construction.

These and other objects, features and advantages of the present invention will become more obvious from the following description when taken in connection with the accompanying drawing which shows, for purposes of illustration only, two embodiments in accordance with the present invention and wherein.

Figure 1:
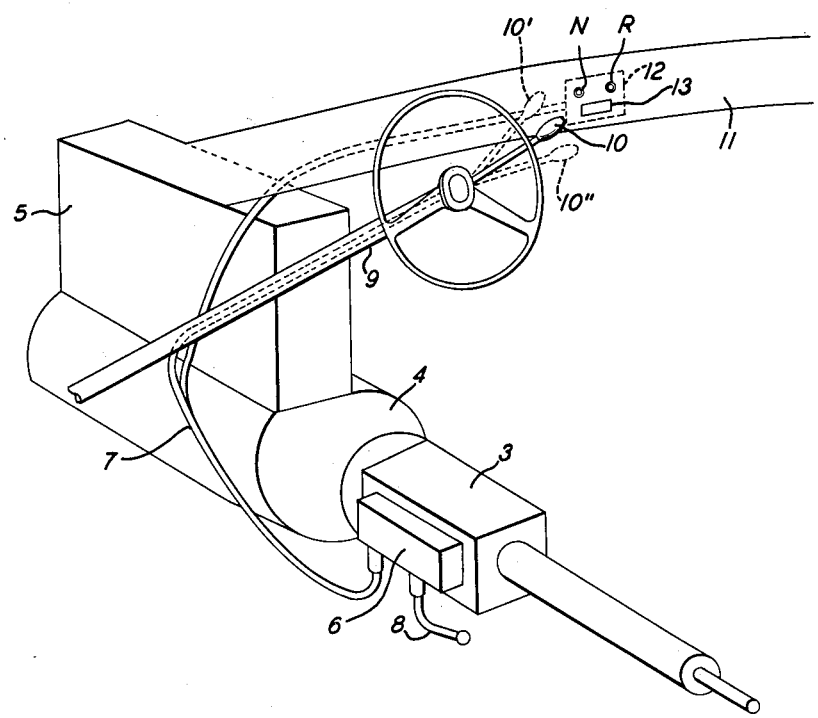
FIGURE 1 is a perspective view of the over-all installation of the change-speed transmission and shifting mechanism including the actuating members therefor in accordance with the present invention.

Referring now to the drawing, wherein like reference numerals are used throughout the various views to designate corresponding parts, and more particularly to FIGURE 1, reference numeral 3 designates the transmission provided with an automatic clutch 4 in series therewith and of known construction, such as an electromagnetically, mechanically or hydraulically controlled clutch, and an engine 5. The transmission 3, the clutch 4 and the engine 5 are combined into a unitary block. Laterally of the transmission 3 a box 6 is secured containing the shifting mechanism in accordance with the present invention, and more particularly the shifting disk for the transmission 3. It is, however, understood that the device in accordance with the present invention may also be combined with the transmission housing 3 to form an integral unitary housing therewith.

In case of a subsequent installation into existing transmissions of the shifting mechanism in accordance with the present invention, an installation such as shown in FIGURE 1 may be used to advantage. The shifting mechanism housed within the auxiliary housing 6 is connected with the actuating member for the transmission by means of a cable 7 of any suitable known type and is further connected by means of conductor 8 with one terminal of the motor vehicle battery (not shown) the other terminal of which may be connected, for example, with the ground as is conventional.

Instead of the usual shifting lever, a handle 10 may be provided at the steering column 9 which is intended as "up-down" shifting device for the selective shifting of the transmission. The handle 10 is actuated manually and closes in the upper position 10' thereof a switch 10a' (FIGURE 2) for shifting the transmission "up," i.e., for engaging a higher speed thereof, and in the lower position 10" for closing a switch 10a" (FIGURE 2) for shifting down, i.e., for engaging a lower speed. A small shifting box 12 is arranged at the dashboard 11 in which are arranged a push button "N" for engagement of the neutral position of the transmission and a further push button "R" for engagement of the reverse speed. If so desired, an additional button "P" for parking or locking the transmission may be provided thereat as will be described more fully hereinafter with reference to FIGURE 4. A picture window 13 may be arranged below the two push buttons N and R in which the particular speed engaged at any time is indicated by an indicating device, for example, in an electric manner.

Thus, in the shifting arrangement according to FIGURE 1, actuation of the neutral or reverse speeds of the transmission is made possible only by means of push buttons "N" and "R" mounted in the small box 12 whereas engagement of any of the forward speeds of the transmission of which any desired number may be provided, is realized by manipulation of lever or handle 10 which, in the position 10' thereof, will shift the transmission up to successive higher speeds and in the position 10" thereof will shift the transmission to lower speeds.

Figure 2:
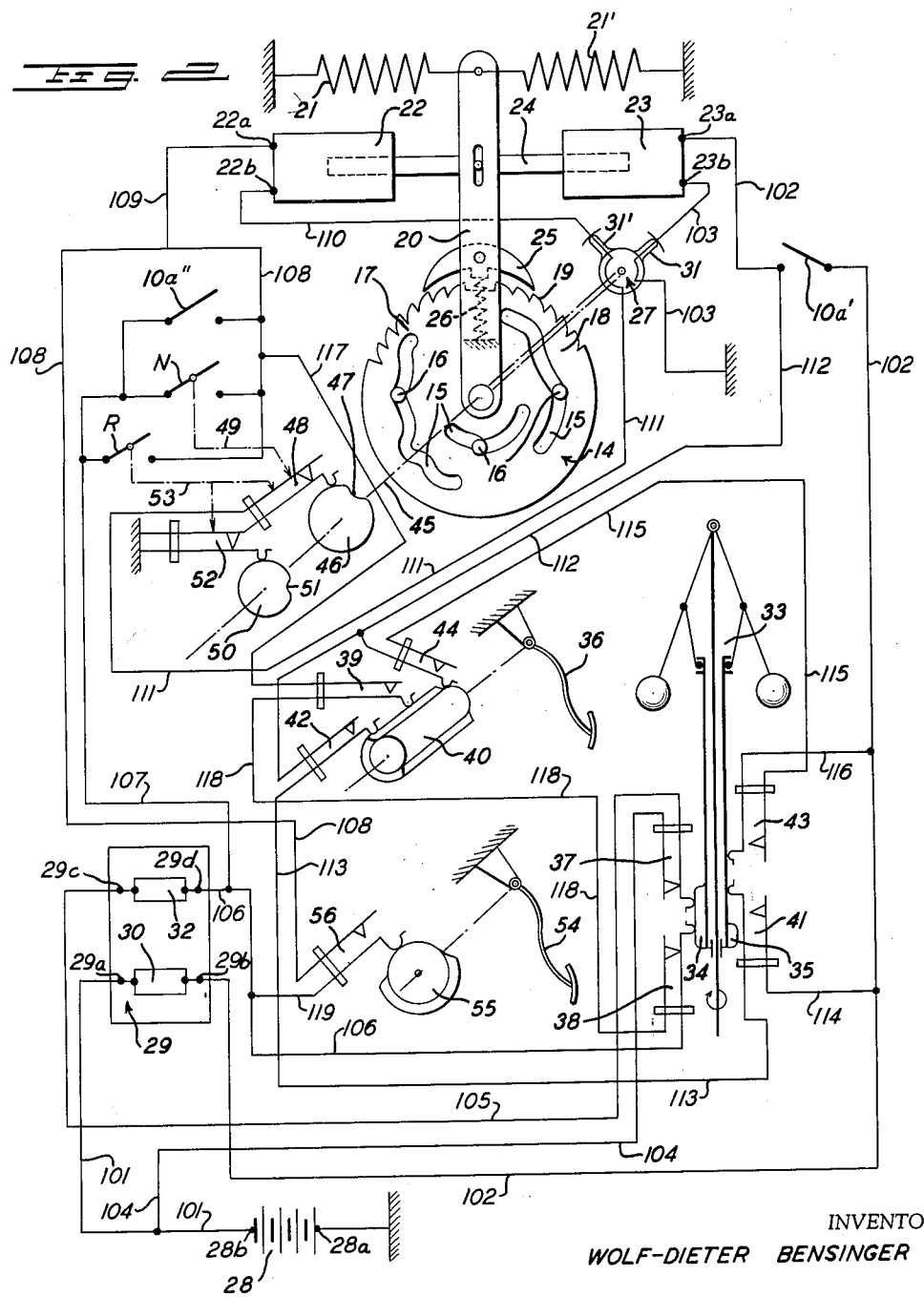
FIGURE 2 is a schematic diagrammatic view for the shifting arrangement illustrated in FIGURE 1.

FIGURE 2 illustrates schematically the arrangement in accordance with the present invention for the engagement of the individual speeds or transmission ratios of the change-speed gear for which purpose a shifting disk, generally designated by reference numeral 14, is provided. The shifting disk 14 is rotatably supported and simultaneously constitutes the step-by-step or stepping shifting mechanism and the guide means for the shifting members. For that purpose, the shifting disk 14 is provided with guide grooves or slots 15 in which bolts 16 of the individual shifting members, for example, of the shifting forks engage either directly or indirectly. Upon rotation of the shifting disk 14, the bolts 16 and therewith the corresponding shifting forks are brought by means of the grooved guide means 15 into the positions corresponding to the respective speeds.

The shifting disk 14 is simultaneously used as a rotatable ratchet wheel and, for that purpose, is provided at the periphery with two groups 17 and 18 of teeth or notches 19. A shifting lever 20 is rotatably mounted on the shaft 45 for the shifting disk 14. The shifting lever 20 is retained in the central position thereof by the two springs 21 and 21' thereby retaining the shifting lever in the neutral position thereof. A double-solenoid 22, 23 is provided for actuating the shifting lever 20, the double-solenoid being constituted by two coils or windings 22 and 23 which are in operative engagement with a common core member 24 which in turn is operatively connected with the shifting lever 20. If so desired, a linkage system providing a leverage-up ratio may be interconnected between the core member 24 and the shifting lever 20 so as to increase the movement of the shifting lever 20 upon movement of the core member 24 in one or the other direction upon energization of coil 22 or 23. An entrainment member or ratchet pawl 25 in the form of a double-armed ratchet is rotatably mounted on the shifting lever 20 and is secured by means of a spring 26 at the transmission housing or another stationary part of the transmission.

The shifting lever 20 is adapted to be rotatably moved in both directions about the shaft of the shifting disk 14 by windings or coils 22 and 23 of the double-solenoid. Energization of the winding 22 is obtained manually by actuation of the handle 10 into the position 10" thereof thereby closing the switch 10a" which is disposed in the current energizing circuit for shifting "down." The winding or coil 23 is energized by means of handle 10 when actuated into the position 10' thereof thereby closing the switch 10a' and establishing a current energization circuit for the shifting "up" the transmission. A toggle switch generally designated by reference numeral 27 is rigidly connected with the shifting lever 20, for example, by being rigidly mounted on the same shaft thereof, whereby the toggle switch 27 is so arranged in the circuits of the windings 22 and 23 of the double-solenoid that upon maximum permissible deflection of the shifting lever 20 the respective current energizing circuit is interrupted. Thus, toggle switch 27 constitutes a limit switch.

A battery 28 or any other suitable power source may be used for energizing the windings 22 and 23. The battery 28 has one terminal 28a thereof connected to ground while the other terminal 28b is connected over line 101 with the terminal 29a of the automatic clutch, generally designated by reference numeral 29. From the terminal 29b of the automatic clutch 29, the line 102 establishes a circuit between the terminal 23a of winding 23 and includes the switch 10a' which is actuated or closed when the handle or lever 10 is in the position 10' thereof. The terminal 23b is connected with ground over a line 103 which includes contact 31 of the toggle limit switch 27.

Further separate control members are coordinated or operatively connected with the automatic clutch 29 which influence the control member of the engine, for example, the gas pedal of the engine or linkage connected therewith, during the clutching operation in such a manner that during shifting "up" to a higher speed, the engine is throttled whereas during shifting "down" to a lower speed the engine rotational speed is increased by a predetermined amount or is maintained at least at the same rotational speed. Such an arrangement has the advantage that the foot may rest on the gas pedal during shifting without changes. For purposes of throttling the engine, a control member 30 is provided which has only been indicated schematically in the drawing, and which, for simplicity's sake, has been illustrated together with the automatic clutch 29. However, it is understood that the control member 30 which may be an electromagnetically actuated device, for example, a link system energized by means of a relay which is operatively connected with the engine output adjusting mechanism in any suitable manner may be arranged separate and apart from the clutch 29.

A branch line 104 connected to the line 101, connected with terminal 28b of battery 28, leads to a set of contacts 37 controlled by a centrifugal governor 33 which is driven at the speed of the engine. From contacts 37, a line 105 leads to the automatic clutch 29 and more particularly to terminal 29c thereof. A line 106 is connected with the terminal 29d of the automatic clutch 29. A branch line 107 is connected with the line 106 and leads to one terminal of each of the switches R, N and 10a" which are thereby all connected in parallel. The other terminals of switches R, N and 10a'' are connected together in parallel by a line 108 which in turn leads to the terminal 22a of coil 22 over a line 109. The terminal 22b of coil 22 is connected over line 110 with contact 31' of limit switch 27 and thereupon over line 111 with switch 48 which is connected in series with switch 52 and one contact or terminal of which is connected to ground.

A branch line 112 leads from the open terminal of the switch 10a' to one contact of switch 42, the other contact of which is connected over line 113, the contacts of switch 41 controlled by the centrifugal governor 33 and line 114 with the line 102 thereby establishing a parallel circuit over line 112, switch 42, line 113, switch 41, and line 114 in parallel with the switch 10a'.

One contact of switch 44 which is controlled by the cam shaft or cam cylinder 40 itself actuated by the gas pedal 36, is connected with the line 112 while the other terminal of switch 44 is connected over line 115 with the switch 43 which is controlled by the cam 35 connected to the shaft of the centrifugal governor 33. The other contact of switch 43 is connected over line 116 with line 102 so that line 112, switch 44, line 115, switch 43 and line 116 provide another circuit in parallel with the switch 10a'.

A line 117 connected with the line 108 itself interconnecting the open terminals of switches R, N and 10a'', is connected with one contact of switch 39, the other contact of which is connected over line 118 with one contact of switch 38 controlled by cam 34 of the centrifugal governor 33. The other contact of switch 38 is connected with line 106 leading to the terminal 29d of the automatic clutch 29 as described hereinabove.

A control or actuating member 32, schematically illustrated in FIGURE 2, and analogous to member 30, is also associated with the automatic clutch 29 and more particularly is disposed between lines 105 and 106. The control member 32 which may be, for example, an electromagnetically actuated control member interconnected by a suitable linkage system with the engine output regulating member, such as throttle valve actuating linkage or adjusting rack for the fuel pump, is so arranged that upon energization thereof, for example, upon closure of switch 10a'' a relay (not shown) is energized which so adjusts the engine output adjusting member that the speed thereof is at least maintained constant or preferably is increased a predetermined amount by supplying more gas to the engine.

Line 108 leading from the open terminals of the switches R, N and 10a'' is connected with one contact of switch 56, the other contact of which is connected over line 119 with the line 106. The switch 56 is controlled by a cam disk or cylinder 55 itself operated by the brake actuating device, for example, brake pedal 54.

*Operation*

The operation of the arrangement and shifting mechanism described hereinabove is as follows:

If the driver intends a shifting "up," i.e., engagement of a higher speed or transmission ratio, then he moves the handle 10 upwardly into the position 10' thereof and therewith closes the switch 10a'. As a result of closure of switch 10a', current flows from battery 28, line 101, automatic clutch 29, including control member 30, line 102 and switch 10a' to the coil or winding 23 of the double-solenoid.

As mentioned hereinabove, the schematically indicated control devices 30 and 32 are coordinated to the automatic clutch 29 and influence the engine output adjusting member, for example, the gas pedal thereof or the injection pump adjusting rack, during clutch-actuating operation in such a manner that when shifting up to a higher speed the engine is throttled to prevent too high a rotational speed of the engine upon engagement of the next higher speed whereas when shifting down to a lower speed, the control member for the engine, such as the gas pedal 36 or fuel adjusting rack of the injection pump, is adjusted to a position corresponding to a higher engine speed or at least to a position maintaining the prevailing engine rotational speed. For that purpose, any suitable adjusting mechanism, such as a mechanical linkage connected with the control members 30 and 32 and actuated in any suitable manner, for example, electromagnetically, are interconnected, for example, either directly or by means of a lost-motion connection, with the linkage or connection between the gas pedal and the member controlling the engine output. Since such arrangements are old in the art, a detailed description is dispensed with herein for the sake of simplicity and clarity of the present invention.

The provision of the control members 30 and 32 has the advantage, as mentioned hereinabove, that the person driving the vehicle need not take his foot off the gas pedal during the shifting operation but may leave it there in the same position.

Thus, upon closure of switch 10a' to shift "up" coil 23 is energized while the current flowing in the circuit 101 and 102 at the same time so actuates the control member 30 as to produce a reduction in the engine speed.

Energization of the winding 23 moves the core member 24 and therewith the shifting member 20 toward the right, as viewed in FIGURE 2. The entrainment member or ratchet 25 thereby comes into engagement with the next adjacent notch 19 of group 18 and thereby rotates the shifting disk 14 into the position corresponding to the next higher speed. As soon as the shifting lever 20 has reached its maximum deflection, the switching finger 31 at the toggle switch 27 slides off its contact. Consequently, the circuit 103 connecting terminal 23b of winding 23 with ground is opened and the current circuit is interrupted. As soon as the circuit is thus interrupted, the coil 23 becomes de-energized again and the shifting lever 20 is returned into the neutral position thereof by the action of spring 21'. The shifting operation to the next higher speed is thereby completed.

The "down" shifting to a lower speed takes place in principle in the same manner. The driver pushes the handle 10 at the steering column downwardly into the position 10'' thereof and therewith actuates or closes the switch 10a''. Closure of the switch 10a'' provides a current circuit for coil 22 over line 104, switch 37, line 105, automatic clutch 29 including control member 32, lines 106 and 107, switch 10a'', and lines 108 and 109. As a result thereof, the coil 22 of the double-solenoid is energized together with the control member 32 which produces an increase in the speed of the engine or at least maintains the engine speed constant, as pointed out hereinabove. Thus, by the energization of coil 22, shifting lever 20 is moved toward the left by the core member 24 as viewed in FIGURE 2 of the drawing so that the ratchet or entrainment member 25 now comes into engagement with the next adjacent tooth or notch 19 of group 17 provided along the pehiphery of the shifting disk 14 and therewith rotates the shifting disk 14 in the counterclockwise direction. Shifting to the next lower speed then takes place in an analagous manner described in connection with shifting "up." As soon as the shifting lever 20 reaches its maximum deflection, the switching finger 31' of the toggle switch 27 slides off its contact and thereby interrupts the return circuit from terminal 22b over line 110, toggle switch 27, line 111, and switches 48 and 52 to ground. As a result thereof, coil 22 becomes de-energized, shifting lever 20 is returned to the neutral position thereof by spring 21, and the control member 22 as well as the automatic disengaging means for clutch 29 are again disengaged. Shifting is again terminated therewith.

Step-by-step shifting by several speeds may take place in both directions by the application of a corresponding long pressure on the handle or lever 10 to maintain the switch 10a' or 10a'' closed a sufficiently long time until the predetermined speed is engaged as shown on the indicating device 13 which indicates the particular speed engaged at the particular time. For reasons of simplicity, the indicating device 13 is not illustrated in FIGURE 2. However, it may be interconnected with the transmission in any suitable manner. For instance, the indicating device 13 may be connected with the shaft 45 of the shifting disk 14 whereby rotation of the shifting disk 14 is made to indicate in the device 13 the particular speed engaged at any particular time and corresponding to the particular position of shifting disk 14.

Continuous step-by-step shifting is made possible by the fact that opening of either limit switch 31 or 31' returns shifting lever 20 and therewith the shaft of toggle switch 27 to neutral position in which limit switches 31 and 31' are again closed so that upon continued closure of either switch 10a' or 10a" the shifting operation is continued.

By providing an appropriate number of notches or teeth 19 with each group 17 and 18 corresponding to the speeds of the transmission, which may be engaged in either direction of rotation, the arrangement of FIGURE 2 will automatically prevent faulty shifting if the last speed in a particular direction of rotation is reached.

In order to facilitate operation of the vehicle for the driver as much as possible and in order to prevent faulty shifting, separate special shifting devices and control members are provided which will be more fully described hereinafter.

It is understood that the automatic clutch 29 which may be of any suitable construction, for example, an electromagnetically controlled clutch, is disengaged every time either current flows through line 101 or through line 105, i.e., every time the switch 10a' or 10a" are closed. Re-engagement of the automatic clutch 29 takes place as soon as the respective circuits become de-energized. Since such automatically operated clutches, such as clutches de-energized or disengaged electromagnetically and kept in engagement by mechanical spring pressure, are old and well known in the art, a description and showing thereof is dispensed with herein for the sake of simplicity.

*Automatic Shifting*

The present invention also contemplates a fully automatic shifting either to a higher or lower speed under certain predetermined driving conditions. For that purpose, a speed sensing means, for example, a centrifugal governor 33 which rotates at the engine rotational speed, is arranged on the transmission input shaft and controls by means of cams 34 and 35 thereof, rigidly connected to the longitudinally movable shaft of the centrifugal governor 33, as is well known, four switches 37, 38, 41 and 43, as will be described more fully hereinafter. Furthermore, switches 39, 42 and 44, which are controlled by a cam disk or cylinder 40 which in turn is connected with the engine adjusting member controlling the drive, for example, with the gas pedal 36, are provided for the automatic initiation of certain shifting operations.

As a first feature, the present invention contemplates an arrangement which is to prevent that the transmission can be shifting with an excessive vehicle speed to too low a speed of the transmission, since engagement of too low a speed of the transmission under such conditions might rotate the engine above the safe rotational speed.

For that purpose, a switch 37 is controlled by the cam 34 actuated by the centrifugal governor 33 which, upon surpassing a predetermined rotational speed, for example, 4000 r.p.m. opens the current circuit for the "down" shifting, i.e., for shifting to a lower speed. As the speed of the engine and therewith of the transmission input shaft which controls the centrifugal governor 33 exceeds a predetermined speed, the cam 34 which moves upwardly as viewed in FIGURE 2 will move such a distance as to enable opening of switch 37. Since switch 37 is connected in the circuit with line 104 and line 105, constituting the energizing circuit for the "down" shifting, i.e., for shifting to a lower speed by closure of switch 10a", closure of the latter will be ineffectual when the engine speed exceeds such predetermined speed. This predetermined rotational speed is so selected that it lies below the maximum rotational speed of the engine in relation to the transmission ratio which would be obtained by the jump caused by shifting in a step-like manner to the lower speed.

A further switch 38 is controlled by the cam 34 at the centrifugal governor 33 which closes when the engine drops below a predetermined rotational speed, for example, 2000 r.p.m. and which is connected in series over line 118 with the switch 39 which in turn is controlled by cam disk or cylinder 40 connected with the gas pedal 36 in such a manner that it closes as soon as the gas pedal 36 has reached the position thereof which corresponds to about three-quarter load or output. Thus, the series circuit 106, switch 38, line 118, switch 39, and line 117 leading to line 108 is in parallel with the circuit consisting of line 107 and switch 10a". In that manner, the transmission is automatically shifted to a lower speed if while driving up an incline or hill the rotational speed of the engine falls below a predetermined value notwithstanding the fact that the driver has given gas. As so-called "forcing" of the engine is thereby prevented.

The other cam 35 arranged at the centrifugal governor 33 serves for purposes of automatically controlling the "up" shifting, i.e., the shifting to a higher speed. A switch 41 is controlled by the cam 35 in such a manner that in a predetermined rotational speed range, for example, between 3,000 to 5,000 r.p.m., the switch 41 is closed. The switch 41 is again connected in series over line 113 with another switch 42 which again is controlled by the cam disk or cylinder 40 in turn controlled by the gas pedal 36 and which closes as soon as the half load or output position is attained at the gas pedal 36. Both switches 41 and 42 are disposed in a circuit which is in parallel with the circuit including the switch 10a' for shifting "up." In other words, the circuit including line 114, switch 41, line 113, switch 42, and line 112 is in parallel with a portion of the line 102 and switch 10a'. Consequently, the next higher transmission is engaged if the rotational speed of the input shaft of the transmission is within the range of 3,000 to 5,000 r.p.m. and as soon as the gas pedal is adjusted to half load position thereof.

A further automatic shifting "up" to the next higher speed takes place upon attaining the maximum rotational speed of the engine, for example, 5,000 r.p.m., by closing at that time switch 43 by means of cam 35 of the centrifugal governor 33. The switch 43 is connected in series over line 115 with a switch 44 which closes by actuation through the cam disk 40 as soon as the gas pedal 36 is fully depressed. Again, the circuit 116, switch 43, line 115, switch 44, and line portion 112 are in parallel with the "up" shifting switch 10a' so that the next higher speed is automatically engaged when the maximum safe rotational speed of the engine is reached while the gas pedal is fully depressed.

The actual construction and arrangement of the cams, cam disks or cylinders, and contacts of the switches may be made to suit the particular needs of the construction under consideration. The present invention only serves for purposes of illustration of the shifting principle in accordance with the present invention, it being understood that any suitable construction and arrangement known in the prior art may be used which perform the control functions indicated hereinabove.

*Shifting to Neutral*

Engagement of the neutral position of the transmission is to take place in accordance with the present invention exclusively manually by means of push button or switch N whereas, for reasons of safety of operation, shifting into the neutral position, for example by inadvertent actuation of the "down" shifting switch 10a" or an automatic shifting back is to be prevented.

For that purpose, a cam disk 46 is provided on the shaft 45 supporting the shifting disk 14 which cam shaft 46 includes a notched portion 47. Switch 48 is so arranged that during engaged first speed of the transmission the switch 48 is opened. The switch 48 is arranged in the current energization circuit for the coil 22 for shifting "down," and more particularly between contact 31' of toggle switch 27 and the ground. If the transmission is now shifted to first speed, then the switch 48 opens and any further shifting down or back to neutral cannot be attained either through actuation of the shifting lever into the position 10″ thereof or automatically.

The switch N in the form of a push button at the dashboard 11 of the vehicle (FIGURE 1) serves exclusively for engagement of the neutral position of the transmission. For that purpose, the switch N is operatively connected with the switch 48 in any suitable manner, for example, by a mechanical linkage 49 or a short-circuit switch in parallel with the contacts of switch 48 so as to effectively enable closure of the switch 48 either physically or electrically even if one contact thereof engages the notch 47 of the cam disk 46.

*Engagement of Reverse Speed*

An analogous safety feature for the reverse speed operating in principle similarly to that of neutral position is provided in accordance with the present invention to prevent engagement of the reverse speed or to enable such engagement exclusively by the switch R in the form of a push button at the dashboard 11 of the vehicle. For that purpose, a further cam disk 50 is provided on the shaft 45 of the shifting disk 14 which includes a notch 51 cooperating with one contact of switch 52 in such a manner that in the neutral position of the transmission the switch 52 is opened. Since the switch 52 is connected in series with the return circuit from terminal 23b of coil 23 through toggle switch 27, line 11, and switch 48, opening of switch 52 prevents that the transmission can be shifted from neutral position into reverse speed by actuation of the shifting lever or handle 10 into position 10″ thereof or automatically.

Upon actuation of the switch R, both switches 52 and 48 are closed in any suitable manner, for example, by means of a mechanical linkage 53 or by means of short-circuiting switches suitably energized thereby to effect closure thereof. Only then, engagement of the reverse speed is possible. Again, the actual construction of the cams and switching contacts may be of any suitable appropriate type known in the prior art.

For example, both cam disks 46 and 50 may be combined into a single cam or any other suitable actuation of contacts 48 and 52 may be selected.

*Down-Hill Braking*

The present invention also contemplates to utilize the engine for purposes of braking, for example, during down-hill drive. In this case, it is desirable to permit the engine to run with the highest rotational speed because the highest braking effect would then be produced. This is achieved in the arrangement according to the present invention in that the brake pedal 54 is operatively connected with a cam disk 55 by means of which upon strong braking actuation, i.e., upon depressing brake pedal 54 a predetermined amount, contact 56 is closed. Contact 56 is disposed in a circuit in parallel with the switch 10a″. Such circuit includes line portion 106, line 119, switch 56 and line 108. Consequently, the transmission is shifted back or down automatically to the next lower speed when the brakes are strongly energized whereby, however, excessive rotational speeds of the engine are still prevented by the centrifugal governor 33 in the manner described hereinabove, namely, by opening switch 37 which is in series with the circuit constituted by lines 104 and 105 leading to the automatic clutch 29.

It is thus seen that the arrangement according to FIGURE 2 provides a step-by-step shifting in the "up" or "down" direction of the transmission, the shifting operation being interrupted only when the handle 10 is returned to the intermediate or inactive position or when the end position of the shifting disk 14 corresponding to the highest or lowest gear is reached. In addition thereto, the arrangement according to FIGURE 2 provides for automatic shifting to the next higher speeds or speeds or next lower speed or speeds depending on the setting of the gas pedal and on the rotational speed of the engine. Furthermore, the control arrangement is such as to engage the lowest speed compatible with the safe maximum rotational speed of the engine when the brake is engaged to provide the largest braking effect during down-hill drives. Under all operating conditons, however, the shifting arrangement is supervised and controlled by a speed-responsive means in the form of a centrifugal governor 33 driven at a rotational speed coresponding to the speed of the engine which prevents excessive speeds of the engine under all circumstances.

Figure 3:
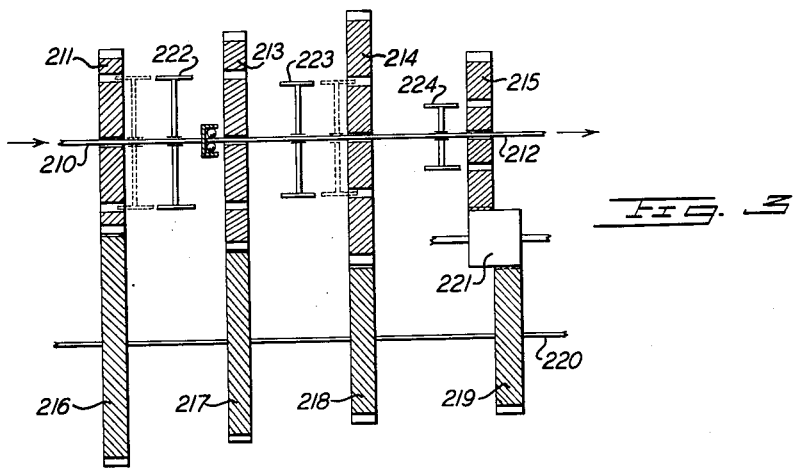
FIGURE 3 is a schematic view of a change-speed transmission for use with a shifting mechanism in accordance with the present invention.

Referring now to FIGURE 3, a four-speed transmission is illustrated therein which consists of a transmission input shaft 210 on which is mounted a gear 211 which is rotatable with respect thereto but axially non-movably. The transmission output shaft 212 is arranged coaxially with the transmission input shaft 210. Gears 213, 214 and 215 are also mounted loosely on the transmission output shaft 212 in a manner so as to be non-movable with respect thereto in the axial direction thereof. Gears 211, 213, 214 and 215 are in constant meshing engagement with gears 216, 217, 218 and 219 which are rigidly mounted on the counter shaft 220. For purposes of obtaining reverse speed, a reversing gear 221 is inserted between gear 219 and gear 215.

A change-speed clutch 222 of known construction is arranged on the transmission input shaft 210 which is connected therewith for common rotation therewith but which is axially movable with respect thereto. The change-speed clutch 222 may be selectively brought into engagement by a shifting fork (not shown in the drawing) with either the gear 211 or with the gear 213. An identical or similar change-speed clutch 223 for the gears 213 and 214 is arranged on the transmisison output shaft 212 and a unilateral clutch 224 for the gear 215 of the reverse speed is also arranged thereon.

Shifting of the transmisison indicated in FIGURE 3 is known per se. For example, for purposes of establishing first speed, the change-speed clutch 222 is brought into the position indicated in dash lines in the drawing for engagement with the gear 211 and the change-speed clutch 223 into the position thereof indicated in dash lines for engagement with the gear 214. The transmission of drive or torque takes place from the driving input shaft 210 over gears 211, 216, 218 and 214 to the transmission output shaft 212. The other speeds are obtained by appropriate selective displacement of the change-speed clutches 222 and 223.

A locking of the transmisison illustrated in FIGURE 3 may be obtained as is known by simultaneously engaging two different speeds thereof. Such two speeds may consist of the reverse speed and of a forward speed so that, for example, the clutch 224 is brought into effective engagement with the gear 215 which would normally produce reverse speed and clutch 223 is brought into engagement with the gear 214 which would normally produce a forward speed. Another possibility for establishing a locking of the transmisison consists in that during effective engagement of the reverse speed by engagement of clutch 224 with gear 215, clutch 223 may be connected with the gear 213 to produce another forward speed. In both cases, the transmission output shaft 212 is non-rotatably locked. If, in addition thereto, the transmission input shaft 210 is to be also locked, then, in addition to the shifting operations described hereinabove, the change-speed clutch 222 is additionally engaged either with the gear 211 or with the gear 213.

Figure 4:
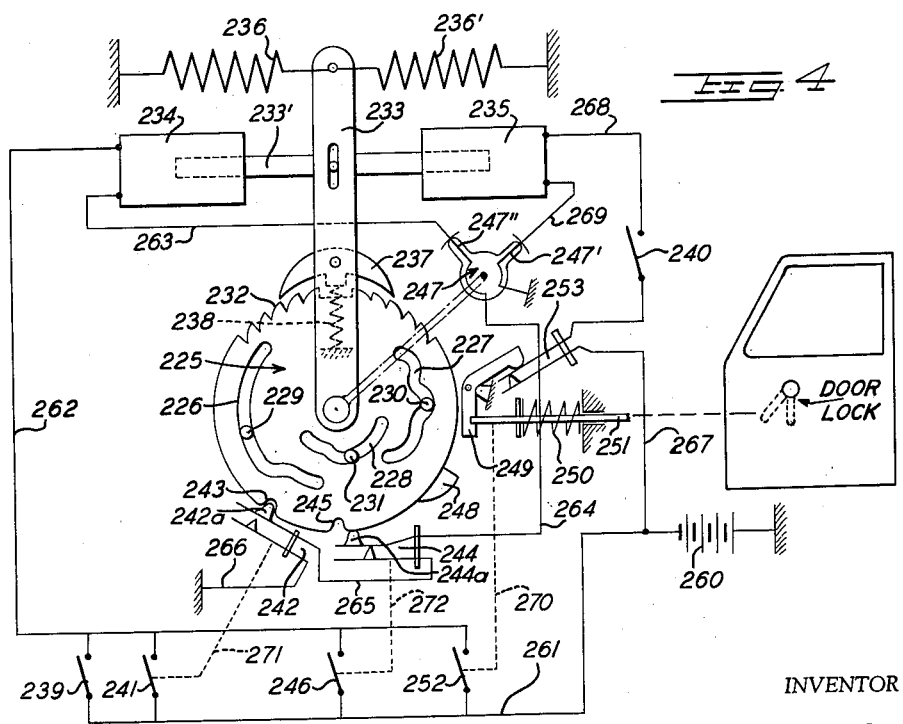
FIGURE 4 is a schematic diagrammatic view of the shifting mechanism, particularly for the transmission illustrated in FIGURE 3, provided with a locking mechanism and shown in the drawing in a simplified schematic manner.

FIGURE 4 illustrates schematically a shifting arrangement in accordance with the present invention for purposes of obtaining the transmission locking described hereinabove in connection with a shifting arrangement of the semi-automatic type operative with an automatically engaged and disengaged clutch, and which includes a shifting disk 225 which controls the shifting operation of the change-speed transmission and which serves as guide means for the speed control members, such as the shifting forks. More particularly, the shifting disk 225 is provided with slots 226, 227 and 228 for guiding the shifting forks 229, 230 and 231. The change-speed clutch 222 of FIGURE 3 is thereby shifted by the shifting fork 229, the change-speed clutch 223 by the shifting fork 230 and the change-speed clutch 224 by the shifting fork 231. The shifting disk 225 is simultaneously constructed as a step-by-step shifting mechanism and for that reason is provided along the periphery thereof with two groups of notches or teeth 232 the numbers of which correspond to the number of speeds of the change-speed transmission. The movement of the shifting disk 225 in both directions takes place by means of a shifting lever 233 with the aid of a double-solenoid including windings 234 and 235 which actuate the common core member 233'. The core member 233' may be connected with the shifting lever 233 either directly or by means of a mechanical linkage to provide a step-up of movements of shifting lever 233 by core member 233'. The return springs 236 and 236' assure that the shifting lever 233 is returned to the neutral position as soon as either windings 234 or 235 are de-energized. An entrainment member or ratchet 237 is pivotally arranged at the shifting lever 233 which ratchet engages under the force of spring 238 with the notches or teeth 232 and therewith enables rotation of the shifting disk 225 upon deflection or movement to the left or right of the shifting lever 233, as described in connection with FIGURE 2. The slots 226, 227 and 228 are so constructed that a further position additional to the speeds of FIGURE 2 is obtained thereby which follows the position corresponding to the reverse speed and in which further position, with clutch 224 engaged for reverse speed, both change-speed clutches 222 and 223 are also engaged thereby effectively locking the transmission in itself, as well as the transmission input shaft 210 and the transmission output shaft 212.

Shifting of the shifting disk 225 takes place in the forward speeds by means of two switches 239 and 240 corresponding to switches 10a' and 10a", of which the former is connected in the energizing circuit for the solenoid or winding 234 for shifting "down" to the next lower or lower speeds and the latter is connected in the energizing circuit for the solenoid or winding 235 for shifting "up" to the next higher speed or speeds. For that purpose, a battery 260 with one terminal thereof connected to ground is connected with the other terminal thereof with a line 261 which interconnects one terminal of switches 239, 241, 246 and 252 as will be morely described hereinafter. The other terminal of switches 239, 241, 246 and 252 are interconnected by a line 262 leading to one terminal of the coil or winding 234. Thus, upon closure of switch 239, one terminal of coil 234 is connected with the battery 260 over lines 261 and 262 including switch 239. The other terminal of winding 234 is connected over line 263, finger 247" of toggle switch 247, line 264, switch 244, line 265, switch 242, and line 266 with ground.

The coil or winding 235 for shifting "up" to the next higher speed or speeds is connected with the battery 260 over branch line 267, switch 253 to be described more fully hereinafter, switch 240 and line 268. The other terminal of winding 235 is connected over line 269 and finger 247' of toggle switch 247 with the ground. Switches 239 and 240 may be selectively actuated in any suitable manner, for example, by a hand lever similar to the handle or lever 10 of FIGURE 1, or may also be actuated by appropriate push buttons provided at the dashboard of the vehicle.

Notch 243, provided in the periphery of cam disk 225, cooperates with switch 242 to enable opening thereof when one contact member of switch 242 engages in the notch 243. Similarly, notch 245 provided along the periphery or shifting disk 225 enables opening of switch 244 when one contact member thereof engages with the notch 245.

An angle lever 249, mechanically connected, for example, by linkage 270, with switch 252, controls the switch 253. The lever 249 is adapted to cooperate with the abutment 248 provided at the shifting disk 225 in such a manner that the shifting disk 225 may be moved to the locking position thereof only if the lever 249 is moved out of the path of cam 248 by rod or linkage 251 against the spring pressure 250.

*Operation*

In order to provide shifting "up," switch 240 is closed, thereby energizing the winding 235 over line 267, closed switch 253, switch 240, and line 268, and return circuit constituted by line 269, finger contact 247' of toggle switch 247 and ground. The energization of winding 235 continues as long as switch 240 depressed and until the shifting lever 233 reaches its end position thereby opening toggle switch 247, in a manner similar to that of FIGURE 2.

Shifting "down" to a lower position takes place by closure of switch 239, thereby connecting one terminal of winding 234 with battery over lines 262, switch 239 and line 261, the return circuit for winding 234 including line 263, the other finger contact 247" of toggle switch 247, line 264, closed switch 244, line 265, closed switch 242, and line 266 to ground. The shifting operation to a lower speed or speeds will continue until the switch 239 is opened or the other finger contact 247" of toggle switch 247 interrupts the current circuit.

*Neutral Position*

The shifting arrangement for the change-speed transmission of FIGURE 4 is again so arranged that engagement of the neutral can take place only by the neutral switch or push button 241, i.e., not by actuation of the normal shifting "down" switch, i.e., not by closure of switch 239. By depressing or closing the neutral switch 241, switch 242 is closed, for example, by mechanical linkage 271 or electrically by a short-circuiting switch in parallel therewith, to render ineffectual opening of switch 242 which is disposed in the return circuit for the "down" shifting switch 239 when the shifting disk 225 arrives at the position thereof corresponding to first speed in which the contact member 242a engages the notch 243 and thereby normally opens switch 242. Thus, the neutral position of the change-speed transmission can only be engaged by depressing switch 241 which nullifies opening of switch 242 ordinarily preventing shifting "down" when the shifting disk 225 reaches the position of first speed.

*Reversed Speed*

A similar safety feature is also provided in FIGURE 4 for the engagement of the reverse speed. A second switch 244 is so arranged and coordinated to the shifting disk 225 that the switch 244 is opened when the contact 244a thereof engages the notch 245 provided along the periphery of the shifting disk 225 when the neutral position is engaged. Consequently, only upon actuation of the switch 246 for the reverse speed, can the switch 244 normally open in the neutral position be bridged or short-circuited, such bridging taking place, for example, by mechanically connecting switch 246 with switch 244 by means of mechanical linkage 272 or by providing a short-circuiting switch in parallel with switch 244.

Since switches 242 and 244 are arranged in series one behind the other in the circuit including the toggle switch finger contact 247" and the return circuit to ground for the "down" shifting circuit energizing winding 234, opening of either switch 242 or 244 renders ineffectual switch 239.

*Locking of the Transmission*

For the engagement of the transmission parts effecting locking thereof, a special switch 252 is provided which is also disposed in the energizing circuit for the coil 234 interconnected in the "down" shifting circuit. This switch 252 has to be safeguarded against unintentional actuation thereof in order to avoid damage to the transmission. For that purpose, the shifting disk 225 is provided with an abutment 248 which abuts in the position of the shifting disk 225 corresponding to reverse speed against tripping angle lever 249. Any movement of the shifting disk 225 beyond this position is only possible if the tripping lever 249 is lifted against the spring 250 away from the shifting disk 225. This takes place by a linkage 251 and more particularly only if the transmission output shaft 212 is at standstill. The switch 252 is connected by the linkage 270 with the locking linkage 251 and is simultaneously locked thereby. Consequently, the switch 252 also can be actuated only if the locking linkage 251 has been actuated first during standstill of the transmission output shaft 212 to lift the lever 249. Only in that case, a further shifting "down" into the locked or parking position is possible.

The lever 249 actuates with the other arm thereof, a further switch 253, which is disposed in the current circuit of the shifting-up energization circuit including coil 235. With the lever 249 lifted, i.e., with the locking position of the transmission engaged, the switch 253 is opened so that from this locking position no shifting "up" can take place any more. Shifting "down," for example, by actuation of switches 239, 241, 246 or 252 is no longer possible anyhow since the shifting lever 233 with the entrainment lever 237 no longer finds a corresponding engagement notch 232. Consequently, all shifting is prevented for any practical purpose.

This arrangement for locking the entire shifting mechanism when the parking position of the transmission is engaged may be released by a separate not illustrated switching member, for example, by a by-pass switch (not shown) for the switch 253. This by-pass switch, for example, may be provided as a special safety feature in the form of a safety lock at the dashboard. The switch 252 serving for engaging the locking or parking position of the transmission in which the same is locked may also be actuated automatically, for example, by the door lock during locking of the motor vehicle, for instance, electrically or electromagnetically.

The release mechanism for releasing the blocking means constituted by the lever 249, such as the push button 252 at the dashboard, may be made readily recognizable by special coloring and/or shape thereof. Additionally, it may also be made clearly recognizable to the driver by any other appropriate means, for example, by special illumination, difficult engagement caused, for instance, by a relatively strong spring, friction or the like.

It is thus seen that FIGURE 4 provides a locking arrangement for the transmission in a shifting arrangement which is similar in purpose and operation to that of FIGURE 2.

It is understood that a locking arrangement such as schematically illustrated in FIGURE 4 may also be incorporated in FIGURE 2. Similarly, the various controls illustrated in FIGURE 2 may be incorporated in the arrangement of FIGURE 4, such as the speed-responsive control and the automatic shifting features. Moreover, FIGURE 4 may also be provided with the circuits for automatically engaging and disengaging the automatic clutch as well as the control members such as control members 30 and 32 of FIGURE 2. In addition thereto, the brake-responsive arrangement as well as the gas pedal responsive arrangement of FIGURE 2 may be incorporated in the arrangement of FIGURE 4.

While I have shown and described several embodiments in accordance with the present invention, it is understood that the same is not limited thereto but is susceptible of many changes and modifications within the scope of the present invention. For example, the details and actual constructions may be varied depending on the requirements of the particular installation. Either mechanical or electrical connections and actuations for the various elements may be provided. Furthermore, the features of FIGURES 2 and 4 may be interchanged to provide, for instance, a system which has all the features of FIGURE 2 as well as the locking features for the transmission of FIGURE 4.

Thus, the present invention is susceptible of many modifications and changes within the scope of the present invention and I intend to cover all such changes and modifications as encompassed by the appended claims.

I claim:

1. A shifting arrangement for shifting a motor vehicle change-speed transmission provided with actuating means operatively connected thereto for engaging the individual speeds thereof and with an automatically actuated main clutch means in series with said change-speed transmission comprising a step-by-step shifting mechanism including guide means in the form of a guide disk provided with surface means and constituting itself the step-by-step shifting wheel adapted to rotate in either direction of rotation, a control system forming effectively a driving means for said guide disk to selectively rotate said guide disk in either direction including a swingable shifting lever having entrainment means adapted to engage directly with said guide disk to thereby directly rotate said guide disk upon swinging movements of said shifting lever during such engagement, and two solenoid means, one solenoid means for each direction of rotation of said guide disk operatively connected with said shifting lever and operative to selectively swing said shifting lever in either direction of rotation and therewith directly rotate said guide disk by said shifting lever in dependence on said control system.

2. A shifting arrangement according to claim 1, wherein said guide disk is provided with slots, and wherein said actuating means are shifting forks in engagement with said slots.

3. A shifting arrangement according to claim 1, wherein said transmission includes a gear box and wherein said shifting mechanism and said guide means are disposed in a housing attached laterally to said gear box.

4. A shifting arrangement according to claim 1, wherein said control system includes means for selectively shifting to the next higher or lower speed.

5. A shifting arrangement according to claim 4, wherein said control system includes means for automatically shifting to the next higher or lower speed depending on the engine rotational speed.

6. A shifting arrangement according to claim 5, wherein said last-mentioned means includes means responsive to the setting of the engine control member for effecting automatic shifting.

7. A shifting arrangement according to claim 6, further comprising separate means for shifting to neutral and to reverse while simultaneously disengaging normal operation of said step-by-step shifting mechanism.

8. A shifting arrangement according to claim 7, further comprising means, separate from said selective shifting means shifting to the next higher or lower speed and from said shifting means shifting to neutral or reverse, for locking the transmission in itself.

9. A shifting arrangement according to claim 1, wherein said control system includes a manually-operable shifting lever to shift to the next higher or lower speed including limit switch means to limit the maximum displacement of said shifting lever means.

10. A shifting arrangement according to claim 1 further including an engine adjusting member and wherein said control system further includes means responsive to the engine speed and to the setting of the engine adjusting member for automatically shifting said transmission.

11. A shifting arrangement according to claim 10, further comprising separate means for actuating said step-by-step shifting mechanism for locking said transmission in itself.

12. A shifting arrangement for shifting a motor vehicle change-speed transmission provided with actuating means operatively connected thereto for engaging the individual speeds thereof and with an automatically actuated main clutch means in series with said change-speed transmission comprising a step-by-step shifting mechanism including guide means in the form of a guide disk constituting itself the step-by-step shifting wheel and adapted to rotate in either direction of rotation, said guide disk being provided along the periphery thereof with a respective group of notches for each direction of rotation and with a bearing shaft to enable rotation thereof, a manually and automatically operated control system forming effectively a driving means for said guide disk to selectively actuate the same for rotation in either direction including a spring-loaded shifting lever supported on said bearing shaft and having tiltable entrainment means adapted to engage directly with either group of notches of said guide disk to thereby directly rotate said guide disk upon such engagement, and a solenoid means for each direction of rotation of said guide disk operatively connected with said shifting lever and operative to selectively swing said shifting lever in either direction of rotation against the spring force and therewith effectively connect the driving means for said guide disk constituted by said control system with said guide disk to effect rotation thereof.

13. A shifting arrangement for shifting a motor vehicle change-speed transmission provided with an automatically actuated clutch means connected in series with the transmission comprising a step-by-step shifting mechanism including a double-solenoid having two individual windings, said transmission including shifting means including a plurality of shifting forks for engaging the individual speeds of said transmission, selectively engageable electrical force means for said shifting mechanism adapted to selectively energize the individual windings of said double-solenoid, guide means connected for actuation of said shifting means and including a shifting disk in direct operative engagement with said shifting forks and provided along the periphery thereof with two groups of notches corresponding in number to the positions of said transmissions to which it may be shifted, spring-loaded shifting lever means including entrainment means for engaging said notches to rotate said disk directly upon displacement of said shifting lever means, and actuating means including said shifting mechanism and said auxiliary force means for selectively moving said shifting lever means into either direction.

14. A shifting arrangement according to claim 13, further comprising toggle limit switch means connected with said shifting lever means to limit displacement thereof to a predetermined value.

15. A shifting arrangement according to claim 14, further comprising a steering column, and wherein said actuating means includes a shifting lever at the steering column of the vehicle and switch means for closing a circuit for said force means operated by said shifting lever.

16. A shifting arrangement according to claim 12, further comprising an engine adjusting member, and means operatively connected in said control system for adjusting said engine adjusting member during shifting to a higher or lower speed.

17. A shifting arrangement according to claim 1, wherein said control system includes speed-responsive means driven at a speed proportional to the engine speed, an engine-adjusting member, and switch means controlled by said speed-responsive means and said engine-adjusting member.

18. A shifting arrangement according to claim 1, wherein said control system includes speed-responsive means rotating at a speed proportional to the engine speed, a switch opened by said speed-responsive means when the engine rotational speed exceeds a predetermined speed to prevent shifting to a lower speed.

19. A shifting arrangement according to claim 1, wherein said control system includes speed-responsive means driven at a speed proportional to the engine speed, and engine-adjusting output means, and switch means controlled by said speed-responsive means and said engine-adjusting means to close the same when the engine-rotational speed falls below a predetermined speed and when said engine-adjusting means is adjusted to a predetermined engine output position to automatically effect shifting to the next lower speed.

20. A shifting arrangement according to claim 12, wherein said control system includes speed-responsive means rotating at a speed proportional to the engine speed, and engine-adjusting means, and switch means operative to shift to the next higher speed, and controlled by said speed-responsive means and said engine-adjusting means to close said switch means and shift to the next higher speed when the engine rotates within a predetermined range of rotational speeds and said engine-adjusting means is set to a predetermined engine output.

21. A shifting arrangement according to claim 12, wherein said control system includes speed-responsive means operative at the rotational speed of the engine, engine-adjusting means, and switch means for shifting to the next higher speed when said engine-adjusting means is set to the full load position thereof and the rotational speed exceeds a predetermined value.

22. A shifting arrangement according to claim 12, wherein said control system includes means for automatically shifting to a lower speed when the vehicle is being braked.

23. A shifting arrangement according to claim 12, wherein said control system includes separate actuating means disposed on a dashboard and operatively connected with said control system for effecting neutral and reverse position of the transmission.

24. A shifting arrangement according to claim 23, further comprising additional actuating means separate from said last mentioned actuating means and operatively connected therewith for locking the transmission in itself and disabling all other actuating means.

25. A shifting arrangement according to claim 12, wherein said control system includes speed-responsive means rotating at a speed proportional to the engine speed, and engine-output adjusting means, switch means controlled by said speed-responsive means and said engine-adjusting means to prevent excessive rotational speeds of the engine by automatically preventing shifting to a lower speed if the engine speed exceeds a predetermined speed and by automatically shifting to a higher speed if the engine exceeds a predetermined speed and said engine-adjusting means has a predetermined position, and for automatically shifting to a lower speed when the engine-adjusting means has a predetermined position and the speed of the engine falls below a predetermined speed.

26. A shifting arrangement according to claim 12, wherein said control system includes limit switch means, and further switch means in series with said limit switch means and opened when said shifting disk is in a position corresponding to neutral position.

27. A shifting arrangement according to claim 12, wherein said control system includes switch means opened when said shifting disk reaches first, neutral and reverse positions, and means for manually rendering ineffective said opened last-mentioned switch means.

28. A shifting arrangement according to claim 13 for a transmission having a plurality of shafts and a plurality of gears mounted on said shafts, certain of said gears being in meshing engagement with other gears, and some of said gears being rotatably mounted on the respective shafts, clutch means for selectively connecting said rotatable gears with the respective shafts, and wherein said shifting forks actuate said last-mentioned clutch means, and said shifting disk being provided with a position in which at least two speeds of said transmission are engaged to effectively lock the same.

29. A shifting arrangement for a transmission according to claim 28, wherein said shafts include a transmission input shaft and a transmission output shaft and wherein said shifting forks connect the rotatable wheels associated with said input and output shaft non-rotatably therewith when said shifting disk is in said last-mentioned position.

30. A change-speed transmission according to claim 28, wherein the two simultaneously engageable speeds engaged by said shifting disk in said last-mentioned position are as far apart as possible.

31. A shifting arrangement according to claim 30, wherein at least one of said two speeds is a reverse speed.

32. A shifting arrangement according to claim 1, wherein said shifting disk has a plurality of positions corresponding to forward speeds, neutral and reverse speeds, and one additional position in which the transmission is locked in itself.

33. A shifting arrangement according to claim 32, wherein said actuating means are formed by a plurality of shifting forks controlled by engagement with guide slots in said shifting disk, and wherein said shifting disk is provided with two branching slots, one leading to the reverse position thereof and one to the parking position, and means for selectively guiding the respective shifting forks into one or the other of said branch slots.

34. A shifting arrangement according to claim 33, further comprising locking means for preventing return of said shifting disk from said parking position by said actuating means.

35. A shifting arrangement according to claim, 34, wherein said last-mentioned means is operatively connected with a door lock of a vehicle door.

36. A shifting arrangement according to claim 1, wherein said control system includes manual and automatic actuating means for shifting to higher and lower forward speeds as well as to neutral and reverse, and means for shifting to a parking position to lock the transmission in itself.

37. A shifting arrangement according to claim 36, wherein said manual and automatic actuating means are inoperative when said shifting disk is in a position thereof corresponding to the parking position.

38. A shifting arrangement according to claim 37, further comprising a manually-actuatable release means to enable shifting of the transmission from said parking position into any of the other speeds thereof.

39. A shifting arrangement according to claim 38, further comprising separate locking means for said manually-adjustable release means.

40. In a motor vehicle having a steering column with a steering wheel thereon, a dashboard and a change-speed transmission having a plurality of transmission ratios, comprising means for engaging the individual transmission ratios of said change-speed transmission successively in a step-like manner, manual actuating means at said steering column for actuating said engaging means to engage the successive speeds of said transmission, and further actuating means at said dashboard for engaging neutral and reverse positions.

41. The combination according to claim 40, further comprising additional actuating means for locking the transmission in itself to provide a parking position therefor, said additional actuating means being separate from said further actuating means at said dashboard.

42. The combination according to claim 41, further comprising means for enabling actuation of said additional actuating means only during standstill of the transmission output shaft.

43. The combination according to claim 42, wherein said additional actuating means is normally inoperative and means for rendering said additional actuating means operative.

44. The combination according to claim 43, wherein said last-mentioned means is actuated upon closure of the door lock.

45. The combination according to claim 40 further comprising additional actuating means separate from said first-mentioned actuating means and said further actuating means at said dashboard for locking said transmission by the simultaneous engagement of two speeds by said engaging means, and separate locking means for said additional actuating means.

References Cited in the file of this patent

UNITED STATES PATENTS

| | | |
|---|---|---|
| 1,923,995 | Nock | Aug. 22, 1933 |
| 2,092,446 | Fleischel | Sept. 7, 1937 |
| 2,150,408 | Wiebrecht | Mar. 14, 1939 |
| 2,251,464 | Neracher | Aug. 5, 1941 |
| 2,270,581 | Clarke | Jan. 20, 1942 |
| 2,291,690 | Caves | Aug. 4, 1942 |
| 2,302,005 | Caves | Nov. 17, 1942 |
| 2,340,339 | Nicol | Feb. 1, 1944 |
| 2,411,455 | Mullins et al. | Nov. 19, 1946 |
| 2,653,689 | Hasbany | Sept. 29, 1953 |
| 2,740,947 | Davies | Apr. 3, 1956 |
| 2,763,350 | Klaue | Sept. 18, 1956 |
| 2,839,941 | Rugen | June 24, 1958 |
| 2,932,213 | Hale | Apr. 12, 1960 |